(12) United States Patent
Snethen et al.

(10) Patent No.: US 10,864,434 B2
(45) Date of Patent: Dec. 15, 2020

(54) SIMULATION OF MULTIPLE CONNECTED BODIES FOR REAL-TIME APPLICATION

(71) Applicant: Square Enix Ltd., London (GB)

(72) Inventors: Gary Linn Snethen, Fremont, CA (US); Sree Harsha Kalangi, Vista, CA (US)

(73) Assignee: Square Enix Ltd., London (GB)

( * ) Notice: Subject to any disclaimer, the term of this patent is extended or adjusted under 35 U.S.C. 154(b) by 244 days.

(21) Appl. No.: 15/907,127

(22) Filed: Feb. 27, 2018

(65) Prior Publication Data

US 2019/0262698 A1 Aug. 29, 2019

(51) Int. Cl.
*G01L 5/04* (2006.01)
*G06F 3/01* (2006.01)
*A63F 13/211* (2014.01)
*A63F 13/40* (2014.01)

(52) U.S. Cl.
CPC .............. *A63F 13/211* (2014.09); *G01L 5/04* (2013.01); *A63F 13/40* (2014.09); *G06F 3/011* (2013.01)

(58) Field of Classification Search
None
See application file for complete search history.

(56) References Cited

PUBLICATIONS

"Massless Cable for Real-time Simulation" by Servin, M; C. Lacoursière.Computer Graphics Forum; Oxford vol. 26, Iss. 2, pp. 172-184, (Jun. 2007). (Year: 2007).*

\* cited by examiner

*Primary Examiner* — James S. McClellan
*Assistant Examiner* — Peter J Iannuzzi
(74) *Attorney, Agent, or Firm* — Fenwick & West LLP

(57) ABSTRACT

Embodiments relate to simulating the movements of three or more bodies connected on a cord for use in real-time videogame applications. The state of the bodies such as position, velocity, and orientation of the bodies connected by a cord are determined in single pass without iteration. For a given time step and the state of the bodies in the time step, the Jacobian matrix for the connected bodies is calculated. The, the tension in the cord is calculated based on the Jacobian matrix. From the tension, the state of the bodies for the next time step is obtained.

12 Claims, 5 Drawing Sheets

SIMULATION OF MULTIPLE CONNECTED BODIES FOR REAL-TIME APPLICATION

BACKGROUND

The present disclosure relates to simulating a physical system, and more specifically, to modeling movement of connected bodies for real-time game application.

A computer simulation can reproduce the behavior of a physical system using a mathematical model. Computer simulations have become a useful tool for the mathematical modeling of many natural systems in physics (computational physics), astrophysics, climatology, chemistry, and biology, human systems in economics, psychology, social science, and engineering. Simulation of a physical system tend to be computation intensive. Especially, some of these simulations involve computation using iterative loops to obtain reasonably accurate result. The increase in loops and related parameters increases the resource and/or time needed to perform the simulation.

One of such simulations that conventionally uses iterative loops is the simulation of three or more bodies connected on a cord. To obtain a reasonably accurate simulation result, multi-body simulation iteratively involves simulating different sets of two bodies, from the group of connected bodies, until a solution converges. However, such conventional approach is computationally inefficient and consumes computing resources and time so that it can be inappropriate for real-time application.

SUMMARY

Embodiments relate to simulating movements of three or more bodies on a cord in an efficient manner by determining a Jacobian matrix for the connected bodies, determining an tension experienced in the cord at a current time step based on at least the Jacobian matrix, and then determining an updated state of the bodies for a next time step subsequent to the current time step. The Jacobian matrix is based on constraint parameters and the state of the bodies for the current time step. The constraint parameters describe physical properties of the three or more bodies connected by the cord.

In one or more embodiments, the tension is based on external force parameters or external impulse parameters at the current time step as well as the Jacobian matrix. The external force parameters are indicative of external forces applied to the connected bodies at the current time step. The external impulse parameters are indicative of external impulses applied to the connected bodies at the current time step. The updated state of the bodies is based on the determined tension at the current time step.

In one or more embodiments, a state of the bodies for a current time step is received before determining the Jacobian matrix. The state of the bodies at the current time step includes at least one of a position, linear velocity, angular velocity, mass, orientation, and inertia tensor of the bodies.

In one or more embodiments, representations of the bodies and the cord at the next time step are displayed on a display device.

In one or more embodiments, the next time step is updated as the current time step and the steps are repeated with the updated current time step to obtain the state of the bodies in a subsequent time step.

In one or more embodiments, the constraint parameters include at least one of (i) a number of bodies connected by the cord, (ii) distances between each of the bodies, and (iii) whether each of the bodies are allowed to slide along the cord. In some embodiments, the constraint parameters include at least one of a mass of the cord, a flexibility of the cord, and a stiffness of the cord.

The figures depict various embodiments of the present disclosure for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments relate to simulating the movements of three or more bodies connected on a cord for use in real-time videogame applications. The state of the bodies such as position, velocity, and orientation of the bodies connected by a cord are determined in single pass without iteration. For a given time step and the state of the bodies in the time step, the Jacobian matrix for the connected bodies is calculated. The tension in the cord is calculated based on the Jacobian matrix. From the tension, the state of the bodies for the next time step is obtained.

Among other advantages, embodiments enable simulation of three or more bodies connected by a cord in an accurate and efficient manner without increasing computational resource (e.g., processor cycles or memory space) involved in the simulation. By determining and calculating the Jacobian matrix for the connected bodies, a tension in the cord can be calculated in a single processing pass without iterative processes.

Embodiments are described herein with reference to the figures where like reference numbers indicate identical or functionally similar elements. Also in the figures, the left most digits of each reference number corresponds to the figure in which the reference number is first used.

Figure 1:
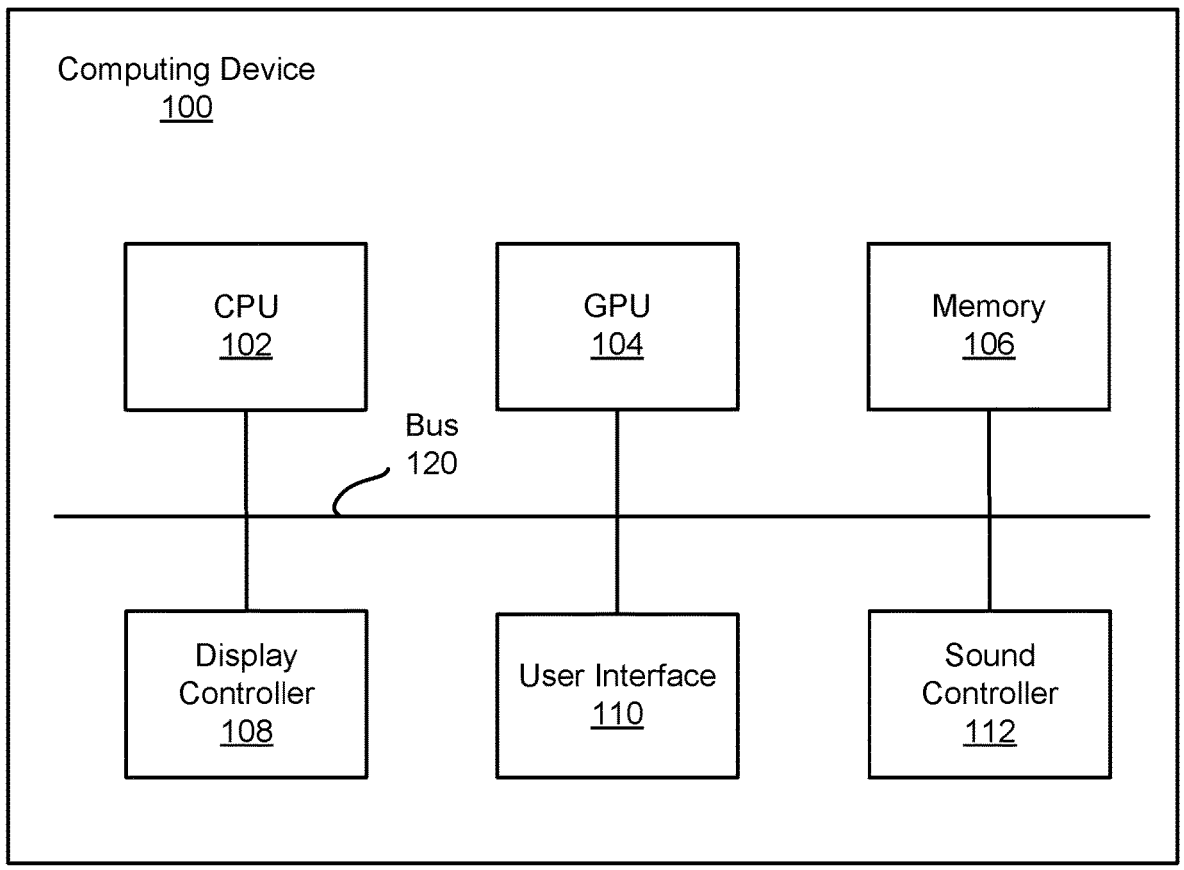
FIG. 1 is a block diagram of a computing device configured to create and display a game environment, according to an embodiment.

FIG. 1 is a block diagram of a computing device 100 for creating and displaying a game environment, according to an embodiment. The game environment described herein involves an emulation of a physical environment. Objects in the game environment may be modeled such that they move as they would in the physical environment. In some embodiments, the objects in the game environment include human or creature characters. Furthermore, a game environment may be a playable environment in a video game. For example, a user controls a character that interacts with objects in the game environment.

Illustrated in FIG. 1 are at least a central processing unit (CPU) 102, a graphics processing unit (GPU) 104, memory 106, display controller 108, user interface 110, and sound controller 112. These modules 102 through 12 communicate via a bus 120. Some embodiments of the computing device 100 have different and/or other components than those shown in FIG. 1.

The computing device 100 may be a personal computer (PC), a video game console, a tablet PC, a smartphone, or any machine capable of executing instructions (sequential or otherwise) that specify actions to be taken by that device. The computing device 100 can operate as a standalone device or a connected (e.g., networked) device that connects to other machines. Furthermore, while only a single device is illustrated, the term "device" shall also be taken to include any collection of devices that individually or jointly execute instructions to perform any one or more of the methodologies discussed herein.

The memory 106 is a machine-readable medium on which is stored instructions (e.g., software) embodying any one or more of the methodologies or functions described herein. For example, the memory 106 may store instructions that when executed by the CPU 102 configures the CPU 102 to perform the method 500, described below in detail with reference to FIG. 5. Instructions may also reside, completely or at least partially, within the processors 102, 104 (e.g., within a processor's cache memory) during execution thereof by the computing device 100.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the device and that cause the device to perform any one or more of the methodologies disclosed herein. The term "machine-readable medium" includes, but is not limited to, data repositories in the form of solid-state memories, optical media, and magnetic media.

The CPU 102 is a processing circuitry configured to carry out the instructions stored in the memory 106. The CPU 102 may be a general-purpose or embedded processor using any of a variety of instruction set architectures (ISAs). Although a single CPU is illustrated in FIG. 1, the computing device 100 may include multiple CPUs 102. In multiprocessor systems, each of the CPUs 102 may commonly, but not necessarily, implement the same ISA.

The GPU 104 is a processing circuit specifically designed for efficient processing of graphical images. The GPU 104 may render objects to be displayed into a frame buffer (e.g., one that includes pixel data for an entire frame) based on instructions from the CPU 102. The GPU 104 may include one or more graphics processors that may execute graphics software to perform a part or all of the graphics operations.

The display controller 108 is a circuit that generates a video signal using graphical data from the GPU 104. For example, the display controller 108 drives a display device (e.g., a liquid crystal display (LCD) and a projector). As such, a game environment can be displayed as images or a video sequence through the display controller 108.

The sound controller 112 is a circuit that provides input and output of audio signals to and from the computing device 100. For purposes of a game environment, the sound controller 112 can provide audio signals that align with actions and objects in the game environment.

The user interface 110 is hardware, software, firmware, or a combination thereof that enables a user to interact with the computing device 100. The user interface 110 can include an alphanumeric input device (e.g., a keyboard) and a cursor control device (e.g., a mouse, a trackball, a joystick, a motion sensor, or other pointing instrument). For example, a user uses a keyboard and mouse to control a character's action within a game environment generated by the computing device 100.

The computing device 100 executes computer program modules for providing functionality described herein. As used herein, the term "module" refers to computer program instructions and/or other logic used to provide the specified functionality. Thus, a module can be implemented in hardware, firmware, and/or software. In some embodiments, program modules formed of executable computer program instructions are loaded into the memory 106, and executed by the CPU 102 or the GPU 104. For example, program instructions for the method 500 describe herein can be loaded into the memory 106, and executed by the CPU 102 and GPU 104.

Figure 2:
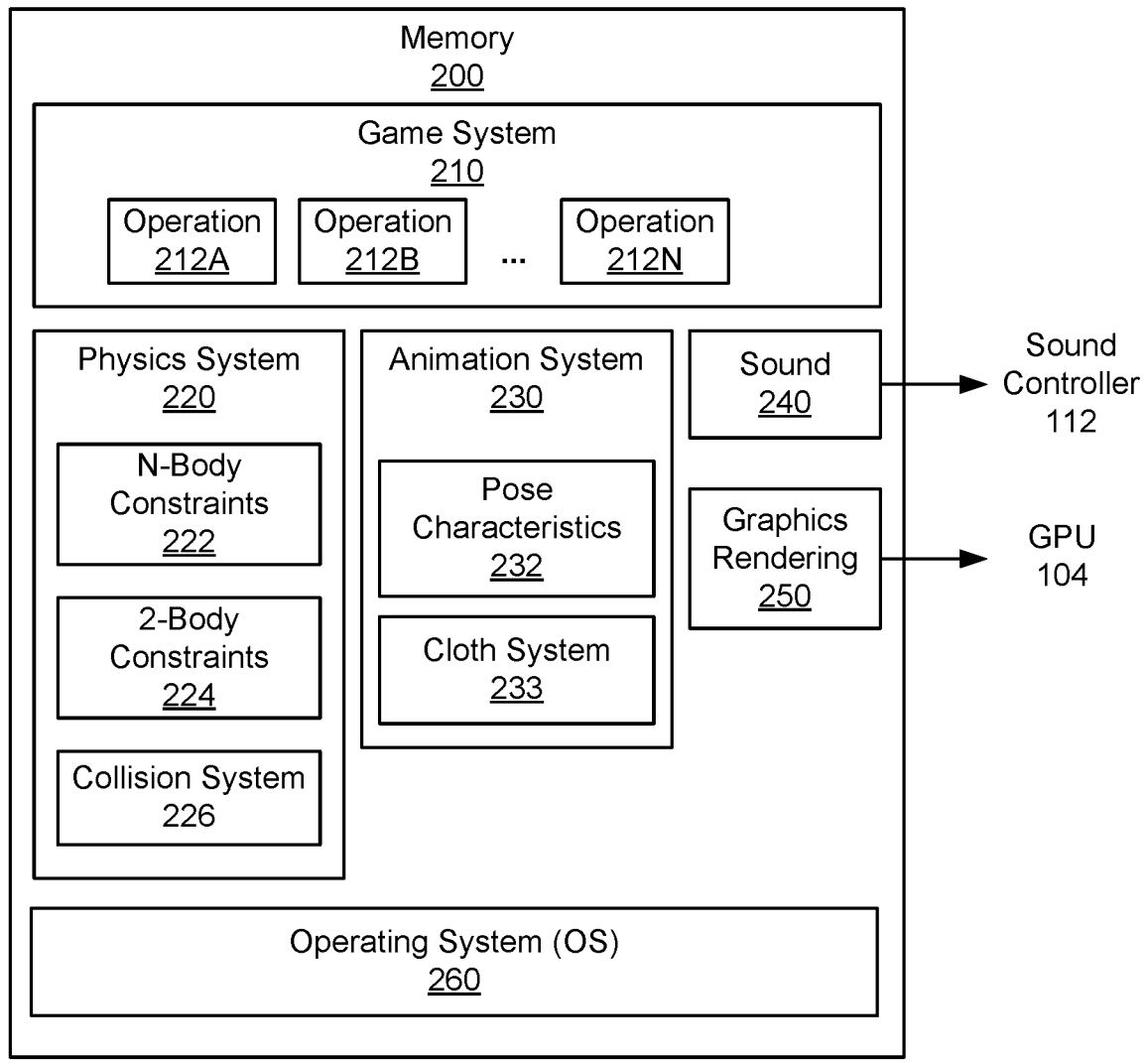
FIG. 2 is a block diagram of software modules in a memory of the computing device of FIG. 1, according to an embodiment.

FIG. 2 is a block diagram of software modules in the memory 106 of the computing device 100, according to an embodiment. The memory 200 may store, among other modules, a game system 210, a physics system 220, an animation system 230, a sound module 240, a graphics rendering module 250, and an operating system (OS) 260. The physics system 220, animation system 230, sound module 240, and graphics rendering module 250 collectively form a game engine. The memory 200 may include other modules not illustrated in FIG. 2.

The game system 210 performs operations 212A through 212N (collectively referred to as "the operations 212") to generate the game environment. Specifically, the game system 210 performs these operations to instantiate various objects and simulate interactions between the objects within the game environment. The operations 212 are refer to computing operation that results in changes in various parameters (e.g., state of objects and user status) based upon certain events (e.g., user interaction, expire of time, and triggers occurring in the game). Some operations 212 are associated with one or more objects in the environment and/or one or more actions associated with the objects. Examples of operations include a catapult launching a rock, a character running, fluid flowing, an arrow flying, a door opening, etc. While some operations 212 have relatively simple responses (e.g., door opening), other operations may need to be simulated by the physics system 220 (e.g., movement of connected bodies). When executing the operations 212, the game system 210 may communicate with the components of the game engine (e.g., physics system 220) through application programming interfaces (APIs). At least one of these operations 212 involves simulating three or more bodies connected by a cord. The state of these connected bodies may change in response to forces or impulse applied to the bodies.

The physics system 220 models and simulates the dynamics of objects in the game environment. After an operation 212 is initiated in the game system 210, the physics system 220 models how the action affects the object associated with the operation 212. For example, the physics system models a rock as it rolls down a hill. Depending on the action and object, other objects and actions may become associated with the action or object. For example, a thrown rock may knock over another object. This may trigger a new operation 212 where the object is hit by the rock.

For this purpose, the physics system 220 may include, among other modules, an n-body constraint module 222, a 2-body constraint module 224, and a collision system 226.

The physics system 220 may also include other modules for performing various specific simulation tasks.

The 2-body constraints module 224 is used to emulate two objects interacting with each other on a cord. For example, the 2-body constrains module 224 can model the movement of a pendulum. The 2-body constrains module 224 can simulate three or more bodies interacting on a cord, for each simulation time step, by iteratively modeling interactions of different sets of two bodies within the group of connected bodies. Due to the iterative modeling for each simulation time step, when three or more bodies are simulated on the 2-body constraints module, more computing resources and time are consumed than the n-body constraints module 222.

The n-body constraints module 222 is a module that simulates the movement of three or more bodies connected by a cord using a single processing pass for a simulation time step. The n-body constraints module 222 determines the state of the bodies in each simulation time step as the bodies or the cord experiences external forces or impulses. The state of the bodies can include a position, linear velocity, angular velocity, mass, inertia tensor, and an orientation of each body. Additionally the n-body constraints module 222 can perform simulations under various constraints, such as fixing one or more bodies in space, allowing bodies to slide along the cord, etc. The n-body constraints module 222 is further described with reference to FIG. 4.

The collision system 226 simulates collisions of objects in the game environment. The collision system 226 can simulate bodies modeled by the n-body constraints module 222. For example, the collision system 226 can determine the collision dynamics of a rock hitting one or more bodies constrained by a cord.

Some operations 212 of the game system 210 may invoke more than one of the modules in the physics system 220. For example, when an operation 212 involves three or more objects sliding on a string and colliding with each other, the operation 212 may use both n-body constraints module 222 and the collision system 226 to simulate the movements of the n-body before and after collision. Such operations 212 may involve iterative processing between n-body constraints module 222 and the collision system 226 for a single simulation time step.

The animation system 230 is a module that performs kinematic animation of objects or the game environment based on the operations 212 from the game system 210. For example, if an operation 212 specifies that a robotic arm is moving, the animation system animates the kinematics of the arm movement.

The animation system 230 may include any number of specialized modules, such as pose characteristics module 232 and cloth system 233, which perform specific animation tasks. The pose characteristics module 232 animates character appearance and movement in the game environment. The cloth system 233 animates cloth movement in the game environment. The cloth can include cloth worn by a character or attached to objects. The pose characteristics module 232 and cloth system 233 (among other animation modules) may animate interactions between objects within the game environment, such as a cloth interacting with a system of connected bodies.

The sound module 240 generates sounds corresponding to actions occurring in the game environment. Animation data from the animation system 230 may be sent to the sound module 240 to enable the sound module 240 to produce sound.

The graphics rendering module 250 renders graphics from the animation system 230 to generate an image of the game environment. For example, the graphics rendering module 250 receives a scene file from the animation system 230. The graphics rendering module 250 sends graphical data to the GPU 104 to render images on a display device via the display controller 108.

The operating system (OS) 260 manages computer hardware and software resources. Specifically, the OS 260 acts as an intermediary between programs and the computer hardware. For example, the OS 260 can perform basic tasks, such as recognizing input from the user interface 110 and sending output to the display controller 108.

Figure 3:
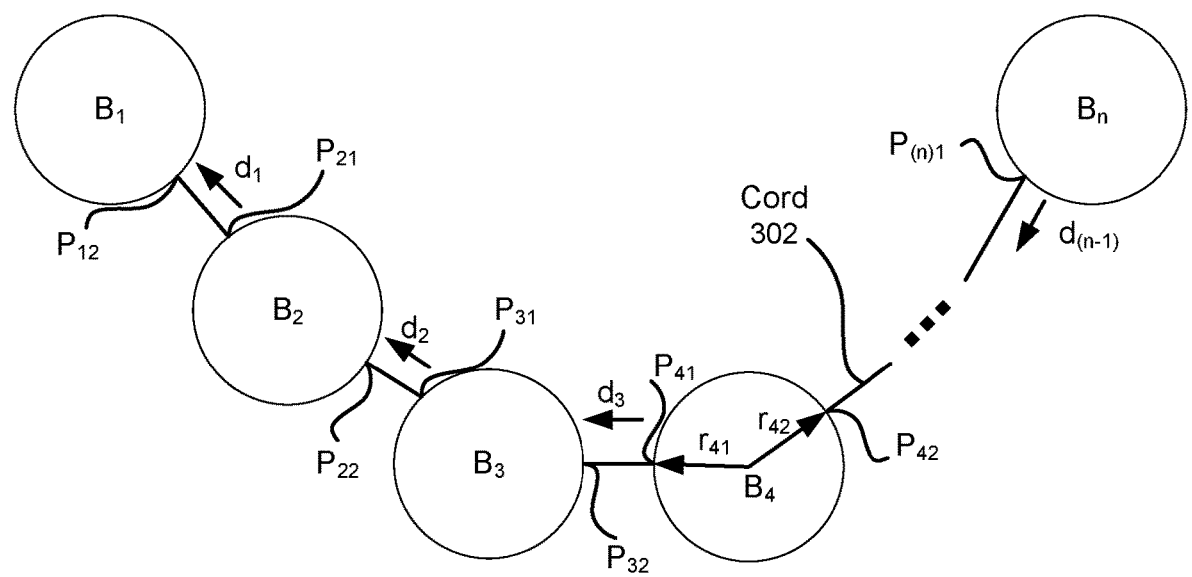
FIG. 3 is a conceptual diagram of bodies connected by a cord, according to an embodiment.

FIG. 3 is a conceptual diagram of bodies $B_1$ through $B_n$ connected by a cord 302, according to an embodiment. The number of connected bodies is three or more (i.e., $n \geq 3$). Each body is indicated by $B_i$ for $1 \leq i \leq n$. Each body can be any object in the game environment, and the cord 302 can be any material that connects the bodies together, such as rope or string. Although FIG. 3 illustrates the end bodies, $B_1$ and $B_n$, as being fixed in space, one or both of bodies $B_1$ and $B_n$ can be movable.

The tension in the cord 302 can be described as follows:

$$\lambda = \frac{-JV}{JM^{-1}J^T t} \tag{1}$$

where $\lambda$ is the tension in the cord 302, J is the Jacobian Matrix, V is the velocity matrix, t is the time step, and M is a mass matrix. V describes both linear $v_i$ and angular $w_i$ velocities for each body. For example, three bodies are expressed as follows:

$$V = \begin{bmatrix} V_1 \\ V_2 \\ V_3 \end{bmatrix} = \begin{bmatrix} v_1 \\ \omega_1 \\ v_2 \\ \omega_2 \\ v_3 \\ \omega_3 \end{bmatrix} \tag{2}$$

M is a sparse matrix that includes the mass of each body $M_i$ and the Inertia Tensor of each body $I_i$. For example, for three bodies $$M = \begin{bmatrix} M_1(\text{Identity}) & 0 & 0 & 0 & 0 & 0 \\ 0 & I_1 & 0 & 0 & 0 & 0 \\ 0 & 0 & M_2(\text{Identity}) & 0 & 0 & 0 \\ 0 & 0 & 0 & I_2 & 0 & 0 \\ 0 & 0 & 0 & 0 & M_3\,\text{Identity} & 0 \\ 0 & 0 & 0 & 0 & 0 & I_3 \end{bmatrix} \tag{3}$$

As such, each body can have a different or same mass as the other bodies.

To determine the Jacobian matrix for the connected bodies $B_1$ through $B_n$, normalized direction vectors are determined as follows:

$$d_i = \frac{(P_{i,i+1} - P_{i+1,i})}{\sqrt{(P_{i,i+1} - P_{i+1,i}) \cdot (P_{i,i+1} - P_{i+1,i})}} \tag{4}$$

where $P_{ij}$ is a position vector, i is an index identifying the body, and j is an index identifying the location on the body where the cord 302 is located. For example, for i=1

$$d_1 = \frac{(P_{12} - P_{21})}{\sqrt{(P_{12} - P_{21}) \cdot (P_{12} - P_{21})}} \quad (5)$$

For n bodies, there are (n−1) number of normalized direction vectors

When n bodies are connected by a cord 302 of length L (e.g., as seen in FIG. 3), the total length can be calculated using the positions of the bodies as follows:

$$L = \|P_{12} - P_{21}\| + \|P_{22} - P_{31}\| + \|P_{32} - P_{41}\| + \ldots \|P_{(n-1)2} - P_{(n)1}\| \quad (6)$$

By differentiating, Equation (6) becomes $$0 = d_1 \cdot (V_{12} - V_{21}) + d_2 \cdot (V_{22} - V_{31}) + d_3 \cdot (V_{32} - V_{41}) + \ldots d_n \cdot (V_{(n-1)2} - V_{n1}) \quad (7)$$

where $V_{ij} = v_i + \omega_i \times r_{ij}$ and $r_{ij}$ is a position vector originating from the center of the $i^{th}$ body and directed to position $P_{ij}$ (e.g., see vectors $r_{41}$ and $r_{42}$ in FIG. 3). As a result, equation (7) can be expressed as $$0 = d_1 \cdot (v_1 + \omega_1 \times r_{12} - v_2 - \omega_2 \times r_{21}) + d_2 \cdot (v_2 + \omega_2 \times r_{22} - v_3 - \omega_3 \times r_{31}) + \ldots + d_n \cdot (v_{n-1} + \omega_{n-1} \times r_{(n-1)2} - v_n - \omega_n \times r_{n1}) \quad (8)$$

After rearranging terms to isolate the linear and angular velocity components, the equation becomes $$0 = d_1^T v_1 + d_1^T R_{12} \omega_1 + (d_2 - d_1)^T v_2 + (d_2^T R_{22} - d_1^T R_{21}) \omega_2 + (d_3 - d_2)^T v_3 + (d_3^T R_{32} - d_2^T R_{31}) \omega_3 + \ldots - d_n^T v_n - d_n^T R_{n1} \omega_n \quad (9)$$

where $R_{ij}$ is the negated cross product skew symmetric matrix of $r_{ij}$ $$R_{ij} = \begin{bmatrix} 0 & r_z & -r_y \\ -r_z & 0 & r_x \\ r_y & -r_x & 0 \end{bmatrix} \quad (10)$$

Thus, the Jacobian matrix for the n bodies is expressed as follows:

$$J = \begin{bmatrix} d_1 \\ (d_1^T R_{12})^T \\ d_2 - d_1 \\ (d_2^T R_{22} - d_1^T R_{21})^T \\ d_3 - d_2 \\ (d_3^T R_{32} - d_2^T R_{31})^T \\ \vdots \\ d_m - d_{m-1} \\ (d_m^T R_{m2} - d_{m-1}^T R_{m1})^T \\ \vdots \\ -d_{n-1} \\ (-d_{n-1}^T R_{n1})^T \end{bmatrix}^T \quad (11)$$

for 1<m≤n. For example, for three connected bodies (n=3), the Jacobian matrix is $J = [d_1^T, d_1^T R_{12}, (d_2 - d_1)^T, d_2^T R_{22} - d_1^T R_{21}, -d_2^T, -d_2^T R_{31}]$. Therefore, referring to Equation (1), the tension in the cord 302 can be calculated if the mass matrix M and velocity matrix V are known, and if the Jacobian matrix J is determined by calculating the linear components $d_1, d_2, \ldots, d_{n-1}$ and angular components $d_1^T R_{12}, d_2^T R_{22} - d_1^T R_{21}, \ldots, -d_{n-1}^T R_{n1}$ of the n bodies.

Depending on the modeled physical system, additional constraints may be included in the Jacobian matrix. Additional constraints may include, for example, the flexibility of the cord, the stiffness of the cord, fixing bodies on the cord, allowing bodies to slide along the cord, the number of bodies or points on the cord that are fixed in space, and the mass of the cord. For example, $$\|P_{12} - P_{21}\| + \|P_{22} - P_{31}\| - \|P_{32} - P_{41}\| - \|P_{42} - P_{51}\| - \|P_{52} - P_{61}\| = L_1 - L_2 \quad (12)$$

is a constraint on a set of six connected bodies (n=6), where $B_3$ is constrained on the cord, $L_1$ is the length of the cord from $B_1$ to $B_3$, and $L_2$ is the length of the cord from $B_3$ to $B_6$.

Figure 4:
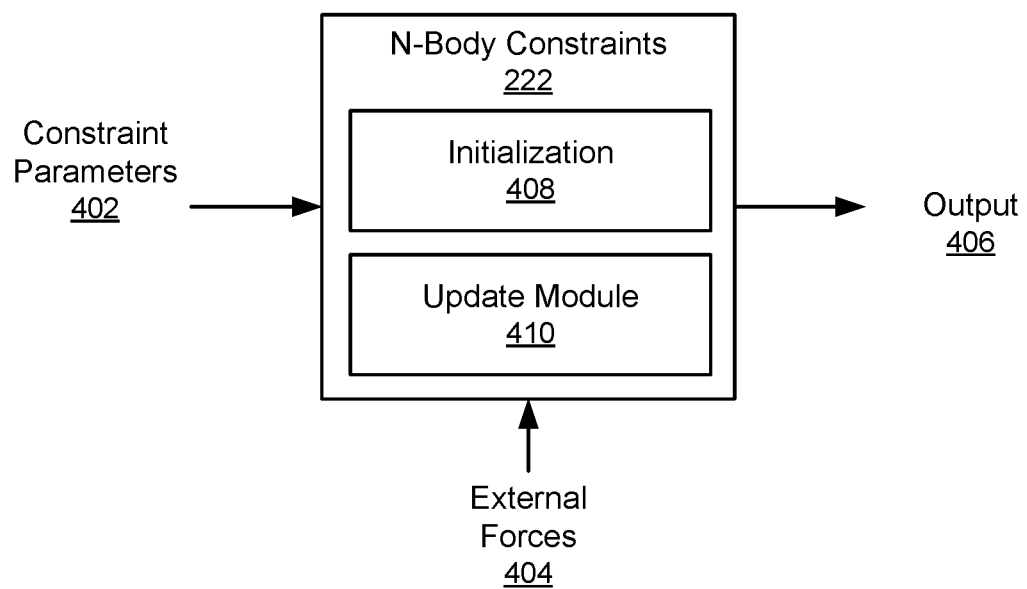
FIG. 4 is a block diagram illustrating modules of the n-body constraints module of FIG. 2, according to an embodiment.

FIG. 4 is a block diagram illustrating modules of the n-body constraints module 222 of FIG. 2, according to an embodiment. As discussed above with reference to FIG. 2, based upon an initial state of n connected bodies and forces and/or impulses experienced by the bodies, the n-body constraint module 222 updates the state of the bodies by simulation as described above with reference to equations (1) through (12). The n-body constraint module 222 may include, among other modules, an initialization module 408 and an update module 410. Furthermore, the n-body constraints module 222 receives constraint parameters 402 and external forces 404 from the game system 210 to produces output 406. In some embodiments, the n-body constraints module 222 has different and/or other modules than those shown in FIG. 4.

Using the received constraint parameters 402 and external forces 404 (or impulses), the initialization module 408 determines and assigns initial values to variables to be used by the update module 410 to determine the updated state of the bodies. The initialization module 408 also receives the initial state of the bodies (not seen in FIG. 4). In some embodiments, the initialization module 408 receives the state of the bodies from the update module 410. As described above with reference to FIG. 3, the state of the bodies can be the values for the velocity matrix V, the position vectors $P_{ij}$, normalized direction vectors $d_i$, mass matrix M, and inertia tensors $I_i$.

The constraint parameters 402 include physical properties of the connected bodies. The constraint parameters 402 may include, for example, one or more of the following: the number of bodies connected by the cord, the length of the cord, the distance between each body on the cord, whether each body can slide or is fixed along the cord, the flexibility of the cord, and the stiffness of the cord. For example, as described above with reference to FIG. 3, the constraint parameters 402 provide values for n and L. Generally, these parameters are time invariant, however, time variant parameters may also be used. Time variant parameters may be, for example, the distance between each body on the cord changes if the bodies are not fixed on the cord.

The external forces 404 include impulses (i.e., momentum transfers) or forces experienced by the connected bodies. For example, the bodies experience a constant downward force from gravity while, at a given time step, several bodies receive an impulse from a character colliding with the bodies. The external forces 404 may be time variant at each simulation time step. The forces may include, for example, forces from wind, water, and gravity. Impulses may include, for example, collisions or other interactions with objects. In some embodiments, the external forces 404 contribute to values of the velocity matrix V.

Using the assigned values from the initialization module 408, the update module 410 updates the state of the bodies. Specifically, the update module 410 determines the Jacobian matrix for the physical system described by the input 402, 404 and determines the tension in the cord that satisfies Equation (1). In some embodiments, the tension in the cord 302 is an impulse. Using the tension in the cord, the state of the bodies is calculated and updated.

The output 406 indicates the updated state of the bodies. The output 406 may be used by any number of systems or modules in the memory 200. For example, the output 406 is sent to the animation system 230 so that the movement of the bodies and cord can be animated within the game environment. Additionally, the output 406 can be sent to the collision system 226 to determine if a collision between the connected bodies or another object occurs.

Figure 5:
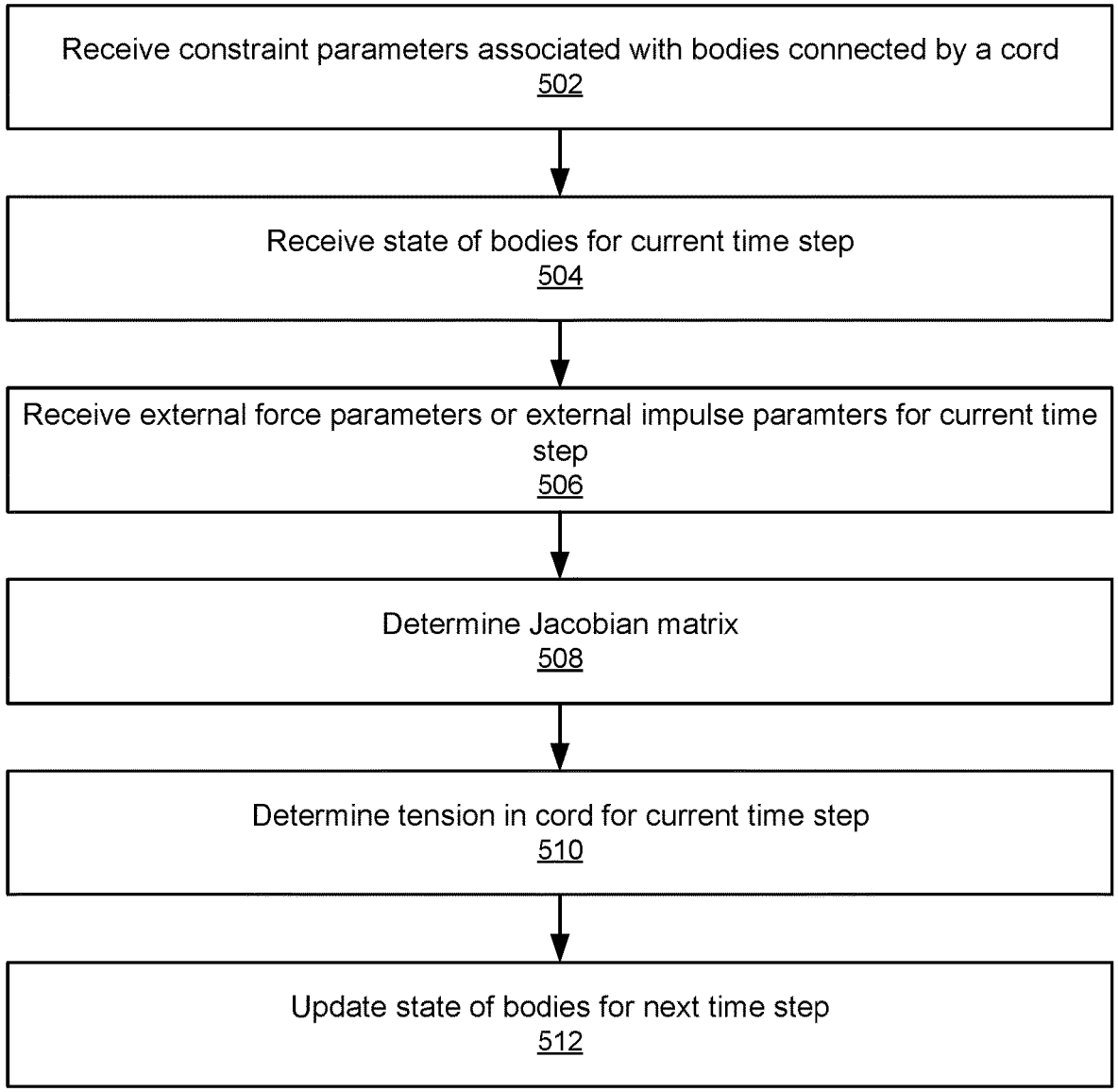
FIG. 5 is a flowchart illustrating a method for simulating movement of connected bodies, according to one embodiment.

FIG. 5 is a flowchart illustrating a method for simulating movement of connected bodies, according to one embodiment. The n-body constraint module receives 502 constraint parameters associated with a set of n-bodies connected by a cord. The constraint parameters describe physical properties of the bodies, such as movement of the bodies. These can include the number of bodies connected by the cord, the length of the cord, the distance between each body on the cord, whether each body can slide or is fixed along the cord, the flexibility of the cord, and the stiffness of the cord.

The n-body constraint module receives 504 the state of the bodies for a current time step. The state of the bodies describes at least one of a position, linear velocity, angular velocity, mass, inertia tensor, and an orientation of each body. The current time step is a discrete time variable within the game environment. To model the movement of the connected bodies, the state of the bodies must be updated for a next time step.

The n-body constraint module receives 506 external force parameters or external impulse parameters for the current time step. The external force parameters are indicative of external forces applied to the connected bodies (e.g., wind). The external impulse parameters are indicative of external impulses applied to the connected bodies.

The n-body constraint module determines 508 the Jacobian matrix. The Jacobian matrix is determined based on the previously received constraint parameters and the state of the bodies for the current time step. In some embodiment, the values of the Jacobian matrix are updated for each time step.

The n-body constraint module determines 510 the tension in the cord for the current time step. The tension is based on the external force parameters, the external impulse parameters, and the Jacobian matrix. In some embodiments, the tension in the cord is an impulse. In some embodiments, the tension is determined by satisfying Equation (1).

The n-body constraint module updates 512 the state of the bodies for the next time step subsequent to the current time step. The updated state of the bodies is based on the determined tension at the current time step.

In some embodiments, representations of the bodies and the cord at the next time step are displayed on a display device. In some embodiments, the next time step is updated to the current time step and steps "receiving 506 external force parameters" through "updating 512 the state of bodies for the next time step" are repeated. In some embodiments, such repetitions are performed in real-time.

The steps illustrated in FIG. 5 may be performed in different orders, for example step 506 can come after step 512. Furthermore, the method may include different, additional, or fewer steps than what are illustrated in FIG. 5.

Although embodiments described above were explained primarily in reference to a game system, the simulation of n-bodies connected by a cord can be applied to other applications such as engineering software and educational software, such as flight and spacecraft training software or surgery simulation software. Additionally, embodiments can be applied to research applications, such as simulating molecular dynamics and protein folding.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method of simulating movements of connected bodies, comprising:
   (a) receiving constraint parameters describing constraints associated with physical properties of three or more bodies connected by a cord, wherein the constraint parameters include a mass of the cord that is greater than zero;
   (b) receiving a state of the bodies including at least one of a position, linear velocity, angular velocity, mass, inertia tensor, and orientation of the bodies at a current time step;
   (c) receiving external force parameters or external impulse parameters, the external force parameters indicative of external forces applied to the connected bodies at the current time step, the external impulse parameters indicative of external impulses applied to the connected bodies at the current time step;
   (d) determining a Jacobian matrix for the connected bodies based on the constraint parameters and the state of the bodies for the current time step;
   (e) determining a tension experienced in the cord at the current time step based on the external force parameters or the external impulse parameters at the current time step and the Jacobian matrix;
   (f) updating the state of the bodies for a next time step subsequent to the current time step based on the determined tension at the current time step; and
   (g) sending for display, on a display device, representations of the bodies and the cord at the next time step based on the updated state,
   wherein each of steps (c) through (f) are performed only once for the current time step.

2. The method of claim 1, further comprising:
   (g) updating the next time step as the current time step; and
   repeating steps (c) through (f) with the updated current time step.

3. The method of claim 1, wherein the constraint parameters include at least one of (i) a number of bodies connected by the cord, (ii) distances between each of the bodies, and (iii) whether each of the bodies are allowed to slide along the cord.

4. The method of claim 1, wherein the constraint parameters further include at least one of a flexibility of the cord or a stiffness of the cord.

5. The method of claim 1, further comprising:
   (g) determining if the updated state of the bodies for the next time step satisfies at least one additional constraint; and (h) responsive to determining that the updated state of the bodies for the next step does not satisfy the at least one additional constraint, revising the state of the bodies at the current time step and reiterating (e) and (f).

6. The method of claim 1, wherein at least one of the external force parameters or the external impulse parameters is determined based on an input received from a user via an input device, and the (c) and (f) are performed in real-time.

7. The method of claim 1, wherein the tension experienced in the cord at the current time step is an impulse.

8. A non-transitory computer readable storage medium with instructions that when executed by a processor cause the processor to:
(a) receive constraint parameters describing constraints associated with physical properties of three or more bodies connected by a cord, wherein the constraint parameters include a mass of the cord that is greater than zero;
(b) receive a state of the bodies including at least one of a position, linear velocity, angular velocity, mass, inertia tensor, and orientation of the bodies at a current time step;
(c) receive external force parameters or external impulse parameters, the external force parameters indicative of external forces applied to the connected bodies at the current time step, the external impulse parameters indicative of external impulses applied to the connected bodies at the current time step;
(d) determine a Jacobian matrix for the connected bodies based on the constraint parameters and the state of the bodies for the current time step;
(e) determine a tension experienced in the cord at the current time step based on the external force parameters or the external impulse parameters at the current time step and the Jacobian matrix;
(f) update the state of the bodies for a next time step subsequent to the current time step based on the determined tension at the current time step; and
(g) sending for display, on a display device, representations of the bodies and the cord at the next time step based on the updated state,
wherein each of steps (c) through (f) are performed only once for the current time step.

9. The computer readable storage medium of claim 8, wherein the instructions further cause the processor to:
(g) update the next time step as the current time step; and repeat steps (c) through (f) with the updated current time step.

10. The computer readable storage medium of claim 8, wherein the constraint parameters include at least one of (i) a number of bodies connected by the cord, (ii) distances between each of the bodies, and (iii) whether each of the bodies are allowed to slide along the cord.

11. The computer readable storage medium of claim 8, wherein the instructions further cause the processor to:
(g) determine if the updated state of the bodies for the next time step satisfies at least one additional constraint; and
(h) responsive to determining that the updated state of the bodies for the next step does not satisfy the at least one additional constraint, revise the state of the bodies at the current time step and reiterating (e) and (f).

12. The computer readable storage medium of claim 8, wherein at least one of the external force parameters or the external impulse parameters is determined based on an input received from a user via an input device, and the (c) and (f) are performed in real-time.

* * * * *